United States Patent
Kim et al.

(10) Patent No.: US 9,823,464 B2
(45) Date of Patent: Nov. 21, 2017

(54) OPTICAL MODULE FOR VIBRATING LIGHT BEAM

(71) Applicant: SAMSUNG DISPLAY CO., LTD., Yongin, Gyeonggi-Do (KR)

(72) Inventors: Kyubum Kim, Yongin (KR); Seungho Myoung, Yongin (KR); Jekil Ryu, Yongin (KR); Wonhee Oh, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 248 days.

(21) Appl. No.: 14/704,897

(22) Filed: May 5, 2015

(65) Prior Publication Data

US 2016/0103313 A1    Apr. 14, 2016

(30) Foreign Application Priority Data

Oct. 8, 2014  (KR) .......................... 10-2014-0135965

(51) Int. Cl.
  *G02B 26/08*  (2006.01)
  *G02B 27/64*  (2006.01)

(52) U.S. Cl.
  CPC ....... *G02B 26/0816* (2013.01); *G02B 26/085* (2013.01); *G02B 27/646* (2013.01)

(58) Field of Classification Search
  CPC .............. G02B 26/0841; G02B 26/105; G02B 26/085; G02B 26/0858; G02B 26/0833; G02B 26/101; B81B 3/0083; B81B 3/0086; B81B 2203/04

USPC ........ 359/198.1–199.4, 200.6–200.8, 202.1, 359/221.2, 223.1–225.1, 226.2, 904, 359/290–295, 838, 846, 871, 872; 250/204, 559.06, 559.29, 230, 234; 347/255–260; 353/39, 98–99; 385/15–18, 22; 398/12, 19, 45
  See application file for complete search history.

(56) References Cited

U.S. PATENT DOCUMENTS

| | | | |
|---|---|---|---|
| 5,748,172 A | 5/1998 | Song et al. | |
| 7,477,440 B1 * | 1/2009 | Huang | ............... G02B 26/0841 359/223.1 |
| 7,723,169 B2 | 5/2010 | Graefe et al. | |
| 2003/0156315 A1 * | 8/2003 | Li | ...................... G02B 26/0833 359/290 |

(Continued)

FOREIGN PATENT DOCUMENTS

| | | |
|---|---|---|
| JP | 11-095317 A | 4/1999 |
| JP | 2002-228967 A | 8/2002 |

(Continued)

*Primary Examiner* — Jennifer L. Doak
(74) *Attorney, Agent, or Firm* — Lewis Roca Rothgerber Christie LLP (57) ABSTRACT

An optical module includes a mirror unit including a mirror holder and a mirror on the mirror holder, the mirror holding including a first plate; a center guide supporting the mirror unit; and an actuator configured to rotate the mirror unit about a rotation axis. The actuator includes a first actuator at the first plate and second and third actuators at second and third plates, respectively, and spaced from each other in a direction parallel to the rotation axis, and the first actuator is configured to be acted upon by the second and third actuators to rotate the mirror unit about the rotation axis.

20 Claims, 8 Drawing Sheets

(56) References Cited

U.S. PATENT DOCUMENTS

2004/0017620 A1* 1/2004 Kaneko .................... G02B 7/02
  359/824
2005/0275710 A1  12/2005 Dewa et al.
2013/0308174 A1  11/2013 Kim et al.

FOREIGN PATENT DOCUMENTS

| JP | 2010-243746 A | 10/2010 |
| KR | 1996-0032034 A | 9/1996 |
| KR | 10-2013-0128242 A | 11/2013 |

* cited by examiner

OPTICAL MODULE FOR VIBRATING LIGHT BEAM

CROSS-REFERENCE TO RELATED APPLICATION

This application claims priority to and the benefit of Korean Patent Application No. 10-2014-0135965, filed on Oct. 8, 2014 in the Korean Intellectual Property Office, the disclosure of which is incorporated herein in its entirety by reference.

BACKGROUND

1. Field

Aspects of one or more embodiments of the present invention relate to an optical module for vibrating a light beam.

2. Description of the Related Art

An optical component, such as a lens or a mirror, is generally installed after being fixed to a mount. For a square vibration mirror, the mount generally has a rotation axis about a center of the mount, and the mirror is led to rotate around (about) the rotation axis by applying a mechanical force to an edge of the mount. Alternatively, the rotation axis may be at an edge of the mount, and the mirror may be vibrated by applying a mechanical force to the opposite edge of the mount.

As described above, to form a vibrating beam, mechanical vibration is applied to a mirror such that vibration of a light beam is induced based on the mechanical vibration of the mirror. Generally, mechanical vibration is applied by a motor or a piezoelectric body (PZT).

Because an optical system is highly sensitive to vibration, vibrations may induce poor beam alignment. As a result, a light beam, such as a laser beam, needs to be regularly realigned, thereby having an adverse effect on the system and the process of applying the vibrating beam.

Furthermore, as size of a mirror increases, weight of a target to be driven increases. Therefore, a sufficient driving force for driving a relatively heavy unit is required. Generally, a driving mechanism based on a piezoelectric body has limited driving force and a drivable displacement in the range of only about hundreds of μm. Therefore, it is difficult to use a piezoelectric body in a driving mechanism that requires a relatively large displacement.

SUMMARY

Aspects of one or more embodiments of the present invention include an optical module for vibrating a light beam capable of contactlessly rotating a mirror to vibrate a light beam and providing sufficient driving force even when the optical module is relatively heavy.

Additional aspects will be set forth in part in the description which follows and, in part, will be apparent from the description or may be learned by practice of the presented embodiments.

According to one or more embodiments of the present invention, an optical module for vibrating a light beam includes a mirror unit including a mirror holder and a mirror on the mirror holder, the mirror holding including a first plate extending from a side of the mirror holder; a center guide supporting the mirror unit, a rotation axis of the mirror unit extending through a center of the center guide; and an actuator configured to rotate the mirror unit about the rotation axis, the actuator including a first actuator at first plate; a second plate and a third plate, the second and third plates being spaced from the first plate; and a second actuator and a third actuator at second and third plates, respectively, wherein the first actuator is movable relative to the second and third actuators, wherein the first actuator is configured to be acted upon by the second actuator and the third actuator to rotate the mirror unit about the rotation axis.

The first plate may be arranged between the second and third plates in a direction parallel to the rotation axis of the mirror unit.

The second actuator may include a first electromagnet array over a first side of the first actuator, and the third actuator may include a second electromagnet array over a second side of the first actuator, the second side being opposite to the first side. The first actuator may include a first permanent magnet array facing the first electromagnet array, and a second permanent magnet array facing the second electromagnet array. The mirror unit may be configured to rotate about the rotation axis due magnetic attraction and magnetic repulsion between the first electromagnet array and the first permanent magnet array and between the second electromagnet array and the second permanent magnet array.

At least one from among the first and second electromagnet arrays and the first and second permanent magnet arrays may be arranged in an arc-like shape.

The first actuator unit may include an electromagnet array, the second actuator unit may include a first permanent magnet array over a first side of the electromagnet array of the first actuator, the third actuator unit may include a first permanent magnet array over a second side of the electromagnet array of the first actuator, the first side being opposite to the second side, and the mirror unit may be configured to be rotated about the rotation axis due to magnetic attraction and magnetic repulsion between the electromagnet array and the first permanent magnet array and between the electromagnet array and the second permanent magnet array.

At least one from among the electromagnet array and the first and second permanent magnet arrays may be arranged in an arc-like shape.

The optical module may further include a guiding structure configured to control mechanical vibration in a direction parallel to the rotation axis of the mirror unit.

The guiding structure may include at least two air-bearing units arranged at opposite ends of the mirror unit.

The guiding structure may include a guide block on the mirror unit and having a groove; and a guide on a base plate and having a curved shape corresponding to a rotation path of the mirror unit, and the groove of the guiding block may be configured to accommodate the guide therein.

The guiding structure may include at least two magnetic bodies at opposite ends of the mirror unit and electromagnets on a base plate, the electromagnets may be configured to repulse the magnetic bodies.

The first plate may be between the second and third plates in a direction crossing to the rotation axis of the mirror unit.

The second actuator may include a first electromagnet array over a first side of the first actuator, the third actuator may include a second electromagnet array over a second side of the first actuator, the second side being opposite to the first side, and the first actuator may include a first iron plate facing the first electromagnet array and a second iron plate facing the second electromagnet array. The mirror unit may be configured to rotate about the rotation axis due to magnetic attraction between the first electromagnet array and the first iron plate or between the second electromagnet array and the second iron plate.

The second actuator may include a first electromagnet over a first side of the first actuator, the third actuator may include a second electromagnet over a second side of the first actuator, the second side being opposite to the first side, and the first actuator may include a first permanent magnet facing the first electromagnet and a second permanent magnet facing the second electromagnet. The mirror unit may be configured to rotate about the rotation axis base due to magnetic attraction and magnetic repulsion between the first electromagnet and the first permanent magnet and between the second electromagnet and the second permanent magnet.

The first actuator may include an electromagnet, the second actuator may include a first permanent magnet over a side of the electromagnet of the first actuator, and the third actuator may include a second permanent magnet over another side of the electromagnet of the first actuator. The mirror unit may be configured to rotate about the rotation axis due to magnetic attraction and magnetic repulsion between the electromagnet and the first permanent magnet and between the electromagnet and the second permanent magnet.

According to one or more embodiments of the present invention, an optical module for vibrating a light beam includes a mirror unit including a mirror holder configured to receive a mirror therein and a plurality of first actuators, the first actuators including permanent magnets; and a second actuator at opposite ends of the mirror unit, including a coil-type electromagnet, and configured to rotate the mirror unit about a rotation axis. The coil-type electromagnet includes an iron pin and a coil wound around the iron pin. The first actuators are configured to move relative to the second actuator, and the first actors are configured to be acted upon by the second actuator to rotate the mirror unit about the rotation axis.

The permanent magnets may be arranged in a direction in which the mirror unit is rotated, and the iron pin may be arranged along a direction parallel to the mirror unit and may have end portions facing the permanent magnets in the direction in which the mirror unit is rotated.

The permanent magnets may be arranged along a direction away from the rotation axis of the mirror unit, the second actuator may include a plurality of second actuators, and the iron pins of the second actuators may be arranged at the opposite ends of the mirror unit and first end portions thereof may face the permanent magnets in a direction away from the rotation axis of the mirror unit and second end portions thereof may face the permanent magnets in the direction in which the mirror unit is rotated.

The mirror unit may include protrusions at the opposite ends of the mirror unit protruding in a direction in which the mirror unit is rotated, the permanent magnets may be arranged at the protrusions in a direction away from the rotation axis of the mirror unit, the second actuator may include a plurality of second actuators, and the iron pins of the second actuators may each have a first end portion facing the protrusions in the direction in which the mirror unit is rotated and second end portions at opposite sides of the respective protrusions and facing each other.

The opposite ends of the mirror holder may have an arc-like shape, the second actuator may include a plurality of second actuators, the iron pins of the second actuators may each have the arc-like shape and at least partially surround the opposite ends of the mirror holder, and arrays of the coils may be on respective surfaces of the iron pins facing the mirror holder.

The center guiding unit may include a flexible hinge or a bearing structure.

BRIEF DESCRIPTION OF THE DRAWINGS

These and/or other aspects and characteristics will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. The present embodiments may have different forms and should not be construed as being limited to the descriptions set forth herein. Accordingly, the embodiments are merely described below, by referring to the figures, to explain aspects of the present description.

It will be understood that although the terms "first," "second," etc. may be used herein to describe various components, these components should not be limited by these terms. These terms are only used to distinguish one component from another.

As used herein, the singular forms "a" and "an" are intended to include the plural forms as well, unless the context clearly indicates otherwise.

It will be further understood that the terms "includes," "including," "comprises," and/or "comprising," when used herein, specify the presence of stated features or components, but do not preclude the presence or addition of one or more other features or components.

It will be understood that when an element or layer is referred to as being "on," "formed on," "connected to," or "coupled to" another element or layer, it may be directly on, formed on, connected, or coupled to the other element or layer or one or more intervening elements or layers may also be present. When an element is referred to as being "directly on", "directly formed on," "directly connected to", or "directly coupled to" another element or layer, there are no intervening elements or layers present. Further, when a first element is described as being "coupled" or "connected" to a second element, the first element may be directly coupled or connected to the second element or the first element may be indirectly coupled or connected to the second element via one or more intervening elements. The same reference numerals designate the same elements.

Sizes of elements in the drawings may be exaggerated for convenience of explanation. In other words, because sizes and thicknesses of components in the drawings may be arbitrarily illustrated for convenience of explanation, the following embodiments are not limited thereto. As used herein, the term "and/or" includes any and all combinations of one or more of the associated listed items. Further, the use of "may" when describing embodiments of the present invention relates to "one or more embodiments of the present invention". Expression, such as "at least one of," when preceding a list of elements, modify the entire list of elements and do not modify the individual elements of the list. Also, the term "exemplary" is intended to refer to an example or illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

Figure 1:
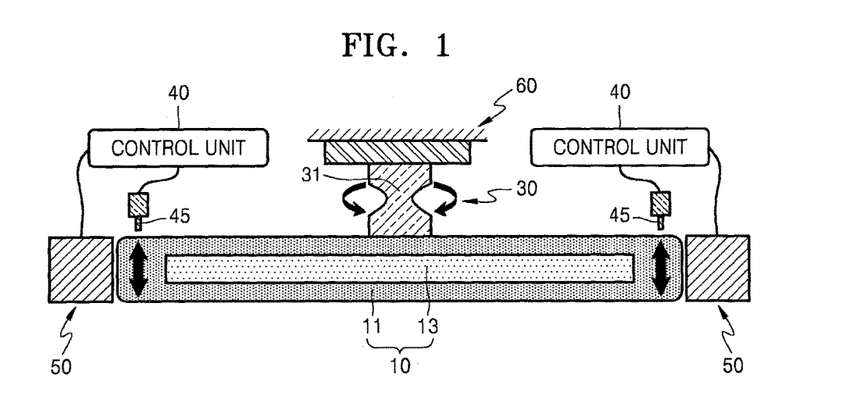
FIG. 1 is a diagram schematically showing an optical module for vibrating a light beam according to an embodiment of the present invention.
Figure 2:
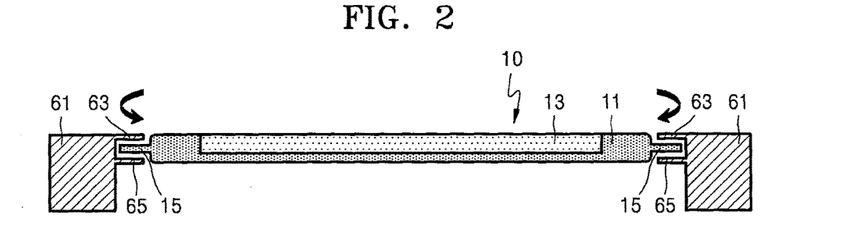
FIG. 2 is a front view of the optical module for vibrating a light beam shown in FIG. 1.
Figure 3:
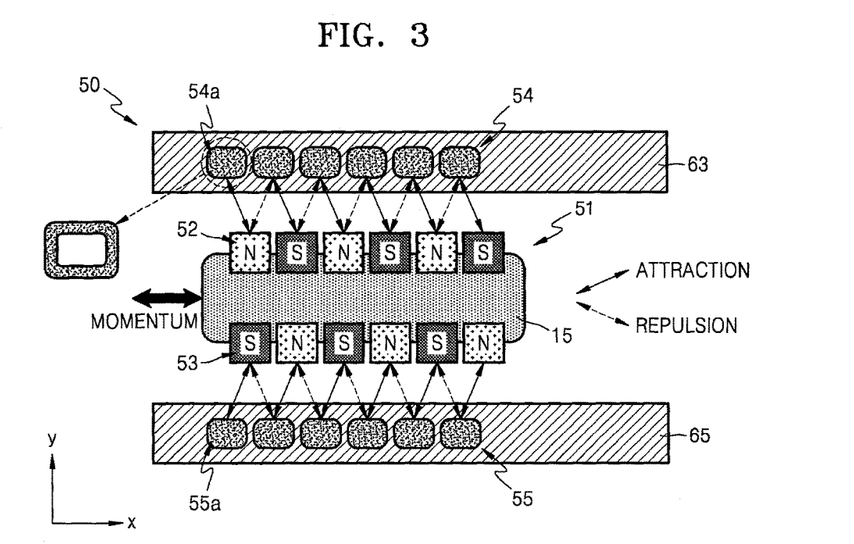
FIGS. 3 and 4 are diagrams showing embodiments of an actuator shown in FIG. 1.

FIG. 1 is a diagram schematically showing an optical module for vibrating a light beam according to an embodiment of the present invention, and FIG. 2 is a front view of the optical module for vibrating a light beam shown in FIG. 1. FIG. 3 is a diagram showing an embodiment of an actuator shown in FIG. 1.

Referring to FIGS. 1 through 3, the optical module for vibrating a light beam includes a mirror unit 10, which includes a mirror holder 11 and a mirror 13 mounted thereon, a center guiding unit 30 supporting the mirror unit 10 and allowing the mirror unit 10 to rotate around (about) a rotation axis, and one or more actuators 50 for rotating (e.g., rotation-driving) the mirror unit 10.

The mirror unit 10 is rotatably supported by a first mount 60 installed at a base plate (e.g., a wall of the ground in FIG. 1) via the center guiding unit 30. The mirror unit 10 is supported by the first mount 60 via the center guiding unit 30 and is separated from (e.g., spaced from) the base plate.

The actuators 50 are units for vibrating a light beam by repeatedly rotating the mirror unit 10 by using, for example, electromagnets and are arranged at opposite sides (e.g., two opposite sides or opposite ends) of the mirror unit 10 to rotate the mirror unit 10 via magnetic attraction and magnetic repulsion.

When power is applied to the electromagnets, momentum is generated based on attraction and repulsion between the electromagnets, and the mirror unit 10 is rotated. As a result, a light beam reflected by the mirror is vibrated. In one embodiment, the mirror 13 is driven to maintain constant angular motion (e.g., to be repeatedly rotated clockwise or counterclockwise) within a particular angle (e.g., within an angular tolerance) with respect to the rotation axis. In one embodiment, displacement and driving frequency of the mirror are controlled by one or more control units 40 that are separately arranged. Displacement sensors 45 may be installed at opposite ends (e.g., two opposite ends) of the rotating mirror unit 10. A target displacement is input to each control unit 40 in advance, and displacements measured by the displacement sensors 45 may be fed back to respective control units 40 such that the measured displacements may be compared to the target displacement input in advance.

As described above, the actuators 50 for vibrating a light beam by repeatedly rotating the mirror unit 10 using magnetic attraction and magnetic repulsion are arranged at the opposite ends of the mirror unit 10, as shown in FIGS. 2 and 3. First plate units 15, which are parallel to the rotating surface of the mirror unit 10 (e.g., extend parallel to the surface of the mirror unit), are arranged at the opposite ends of the mirror holder 11, and one or more first actuator units 51, which are movable portions of the actuator 50, may be installed at the first plate units 15. Furthermore, first mounts 61 are installed outside the opposite ends of the mirror holder 11 at the base plate, and each of the first mounts 61 may further include second and third plate units 63 and 65 which are parallel to (e.g., extend parallel to) the rotating surface of the mirror unit 10 and are spaced from (e.g., spaced apart from) the first plate unit 15 in opposite directions (e.g., the second plate unit 63 may be above the first plate unit 15 and the third plate unit 65 may be below the first plate unit 15). Second and third actuator units 54 and 55, which are fixed portions of the actuator 50, may be respectively installed at the second and third plate units 63 and 65, for example.

For example, the first plate unit 15 is arranged between the second and third plate units 63 and 65, the second and third plate units 63 and 65 and the first plate unit 15 arranged therebetween may be arranged along a direction parallel to the rotation axis of the mirror unit 10, and the first and second plate units 15 and 63 and the first and third plate unit 15 and 65 may be spaced from (e.g., spaced apart from) each other. Therefore, when the mirror unit 10 is rotated by the actuators 50, the first plate unit 15 may move in a space between the second and third plate units 63 and 65 without an interruption (e.g., without contacting either the second or third plate unit 63 and 65), and the rotation of the mirror unit 10 may be guided between the second and third plate units 63 and 65.

In this embodiment, when there is no external force or vibration (e.g., tremor) other than the rotation generated by the actuators 50, an interval (e.g., a distance) between the first plate unit 15 and the second plate unit 63 and an interval (e.g., a distance) between the first plate unit 15 and the third plate unit 65 may be consistently maintained while the mirror unit 10 is repeatedly rotated.

Referring to FIG. 3, the actuator 50 includes a first actuator unit 51 which is arranged at the first plate units 15 at the opposite ends of the mirror holder 11 and, together with the mirror unit 10, constitute a driving unit. The second and third actuator units 54 and 55, which are arranged outside the opposite ends of the mirror holder 11, are fixed portions of the actuator 50 and allow the mirror unit 10 to be repeatedly rotated clockwise or counterclockwise around the rotation axis due to interaction with the first actuator unit 51.

As described above, the first mounts 61 are installed outside the opposite ends of the mirror holder 11 at the base plate, each of the first mounts 61 further includes the second and third plate units 63 and 65 that are spaced from each other in a direction parallel to the rotation axis of the mirror unit 10. The second and third actuator units 54 and 55, which are fixed (e.g., non-moving) portions of the actuator 50, may be installed at the second and third plate units 63 and 65, respectively.

The second actuator unit 54 may include a first electromagnet array 54a arranged to face (e.g., over) a first side of the first actuator unit 51, and the third actuator unit 55 may include a second electromagnet array 55a arranged to face (e.g., over) a second side of the first actuator unit 51, which is opposite to the first side. For example, the first electromagnet array 54a may be arranged at the second plate unit 63, and the second electromagnet array 55a may be arranged at the third plate unit 65. Each electromagnet of the first electromagnet array 54a and of the second electromagnet array 55a may be a coil-type electromagnet.

The first actuator unit 51 may include a first permanent magnet array 52 at the first side thereof facing the first electromagnet array 54a and may include a second permanent magnet array 53 at the second side thereof facing the second electromagnet array 55a. For example, the first permanent magnet array 52 may be arranged on a surface of the first plate unit 15 facing the second plate unit 63, and the second permanent magnet array 53 may be arranged on another surface of the first plate unit 15 (e.g., an opposite surface of the first plate unit 15) facing the third plate unit 65.

In one embodiment, the first electromagnet array 54a, the second electromagnet array 55a, the first permanent magnet array 52, and the second permanent magnet array 53 may be arranged along a direction substantially identical to (e.g., parallel to) a direction of the momentum for rotation the mirror unit 10 (e.g., a direction along which the mirror unit 10 rotates).

When the first actuator unit 51 and the second and third actuator units 54 and 55 are arranged as shown in FIG. 3, the mirror unit 10 may be repeatedly rotated around the rotation axis based on (e.g., due to) magnetic attraction and magnetic repulsion between the first electromagnet array 54a and the first permanent magnet array 52 and between the second electromagnet array 55a and the second permanent magnet array 53 by controlling power respectively applied to the first electromagnet array 54a and the second electromagnet array 55a.

For example, as shown in FIG. 3, when first through sixth electromagnets of the first electromagnet array 54a and first through sixth permanent magnets of the first permanent magnet array 52 are alternately arranged in a zigzag arrangement from the left, the first through sixth electromagnets are controlled to be arranged in the order of S, N, S, N, S, and N along the x-axis direction, and the first through sixth permanent magnets are arranged in the order of N, S, N, S, N, and S along the x-axis direction. In this embodiment, attraction occurs between the first permanent magnet and the first electromagnet and repulsion occurs between the first permanent magnet and the second electromagnet. Attraction occurs between the second permanent magnet and the second electromagnet and repulsion occurs between the second permanent magnet and the third electromagnet. Attraction occurs between the third permanent magnet and the third electromagnet and repulsion occurs between the third permanent magnet and the fourth electromagnet. Attraction occurs between the fourth permanent magnet and the fourth electromagnet and repulsion occurs between the fourth permanent magnet and the fifth electromagnet. Attraction occurs between the fifth permanent magnet and the fifth electromagnet and repulsion occurs between the fifth permanent magnet and the sixth electromagnet. Attraction occurs between the sixth permanent magnet and the sixth electromagnet.

In the same regard, when first through sixth electromagnets of the second electromagnet array 55a and first through sixth permanent magnets of the second permanent magnet array 53 are alternately arranged in a zigzag arrangement from the left, the first through sixth electromagnets are arranged in the order of N, S, N, S, N, and S along the x-axis direction, and the first through sixth permanent magnets are arranged in the order of S, N, S, N, S, and N along the x-axis direction. In this embodiment, attraction occurs between the first permanent magnet and the first electromagnet and repulsion occurs between the first permanent magnet and the second electromagnet. Attraction occurs between the second permanent magnet and the second electromagnet and repulsion occurs between the second permanent magnet and the third electromagnet. Attraction occurs between the third permanent magnet and the third electromagnet and repulsion occurs between the third permanent magnet and the fourth electromagnet. Attraction occurs between the fourth permanent magnet and the fourth electromagnet and repulsion occurs between the fourth permanent magnet and the fifth electromagnet. Attraction occurs between the fifth permanent magnet and the fifth electromagnet and repulsion occurs between the fifth permanent magnet and the sixth electromagnet. Attraction occurs between the sixth permanent magnet and the sixth electromagnet.

Therefore, in the arrangement as shown in FIG. 3, when power applied to the first through sixth electromagnets of the first electromagnet array 54a and power applied to the first through sixth electromagnets of the second electromagnet array 55a are controlled such that attraction prevails over repulsion between the first electromagnet array 54a and the first permanent magnet array 52 and attraction prevails over repulsion between the second electromagnet array 55a and the second permanent magnet array 53, forces in the +y-axis direction and the −y-axis direction are offset and only a force in the −x axis direction remains, and thus, the force (e.g., momentum) is applied in the leftward direction of FIG. 3. Furthermore, when repulsion prevails over attraction between the first electromagnet array 54a and the first permanent magnet array 52 and repulsion prevails over attraction between the second electromagnet array 55a and the second permanent magnet array 53, forces in the +y-axis direction and the −y-axis direction are offset, and only a force in the +x axis direction remains, and thus, the force (e.g., momentum) is applied in the rightward direction of FIG. 3. In this embodiment, the x-axis direction corresponds to a direction in which the mirror unit 10 is rotated.

Therefore, as described above, the mirror unit 10 may be repeatedly rotated around the rotation axis based on magnetic attraction and magnetic repulsion between the first electromagnet array 54a and the first permanent magnet array 52 and between the second electromagnet array 55a and the second permanent magnet array 53 by controlling power respectively applied to the first electromagnet array 54a and the second electromagnet array 55a.

Figure 4:
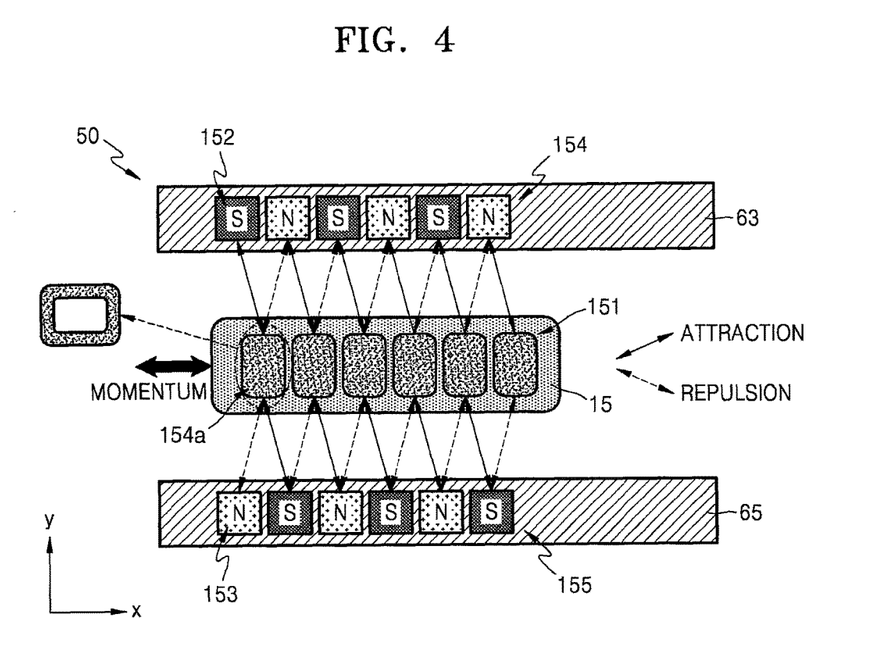

Although the embodiment in which permanent magnets are arranged at movable portions of the actuator 50 and electromagnets are arranged at fixed portions of the actuator 50 is described above with reference to FIG. 3, electromagnets may be arranged at movable portions of the actuator 50 and permanent magnets may be arranged at fixed portions of the actuator 50 as shown in FIG. 4.

Referring to FIG. 4, the actuator 50 may include a first actuator unit 151 arranged at the first plate unit 15 and second actuator unit 154 and third actuator unit 155 that are respectively arranged at the second plate unit 63 and the third plate unit 65. The first actuator unit 151 includes one (e.g., only one) electromagnet array 154*a*, the second actuator unit 154 may include a first permanent magnet array 152, and the third actuator unit 155 may include a second permanent magnet array 153. The electromagnet array 154*a* may be arranged at the first plate unit 15, the first permanent magnet array 152 may be arranged at the second plate unit 63, and the second permanent magnet array 153 may be arranged at the third plate unit 65. In this embodiment, the first permanent magnet array 152 and the electromagnet array 154*a* may be alternately arranged in a zigzag arrangement, and the second permanent magnet array 153 and the electromagnet array 154*a* may also be alternately arranged.

In this embodiment, one or more electromagnets of the electromagnet array 154*a* of the first actuator unit 151 may be a coil-type electromagnet. Therefore, when the coil-type electromagnet(s) exhibits N-polarity with respect to the first permanent magnet array 152, the electromagnet(s) may exhibit S-polarity with respect to the second permanent magnet array 153. When an electromagnet adjacent to the electromagnet(s) exhibits S-polarity with respect to the first permanent magnet array 152, the electromagnet adjacent to the electromagnet(s) may exhibit N-polarity with respect to the second permanent magnet array 153. Therefore, in the embodiment in which the electromagnet array 154*a* is arranged at a movable portion of the actuator 50, the electromagnet array 154*a* may be arranged as shown in FIG. 4 and the mirror unit 10 may be repeatedly rotated around the rotation axis based on magnetic attraction and magnetic repulsion between the electromagnet array 154*a* and the first permanent magnet array 52 and between the electromagnet array 154*a* and the second permanent magnet array 53 by controlling power respectively applied to the electromagnet array 54*a*.

Figure 5:
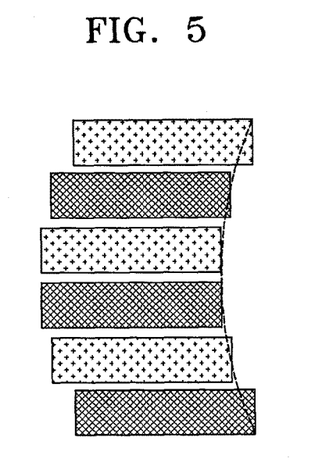
FIG. 5 is a diagram showing an arc-like arrangement of an electromagnet array or a permanent magnet array arranged at an actuator unit.

Meanwhile, because the mirror unit 10 is rotated, an electromagnet array or a permanent magnet array arranged at each of the actuator units as shown in FIGS. 3 and 4 may be arranged in an arc-like shape as shown in FIG. 5. In the electromagnet array and/or the permanent magnet array, N-polarity and S-polarity may be alternately arranged, and polarities are not shown in FIG. 5.

When the electromagnet array and/or the permanent magnet array is arranged in the arc-like shape as described above, the actuator 50 functions as an arc-type motor. In this embodiment, the mirror unit 10 may be smoothly rotated. In one embodiment, the electromagnet array and/or the permanent magnet array arranged at each of actuator units may be arranged in a linear shape so that the actuator 50 may function as a linear motor.

Figure 6:
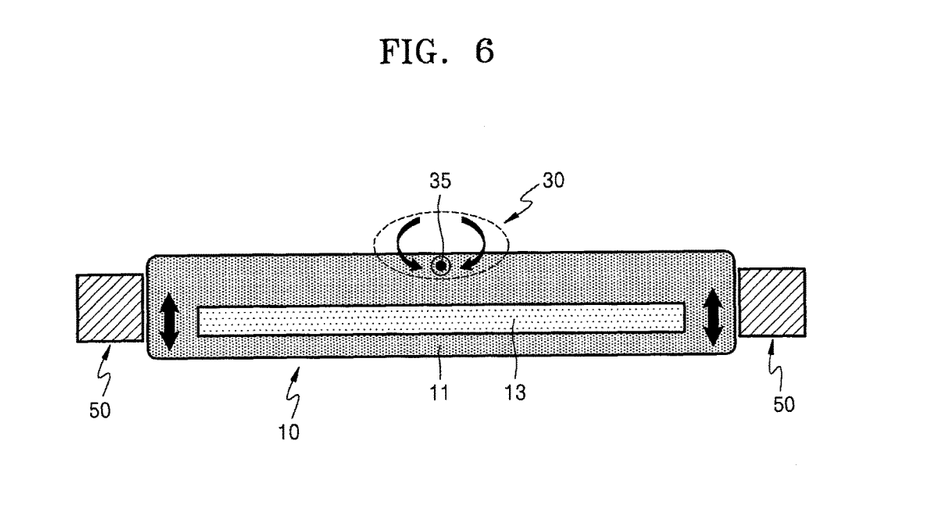
FIG. 6 is a diagram showing an embodiment in which a center guiding unit is a bearing structure.

Meanwhile, referring back to FIGS. 1 and 2, the center guiding unit 30 is a unit for supporting the mirror unit 10 and allowing it to rotate around the rotation axis, and the center guiding unit 30 may have a hinge structure 31. The center guiding unit 30 may also have a bearing structure 35 as shown in FIG. 6. Furthermore, the center guiding unit 30 may have any of various suitable structures as long as the mirror unit 10 may be rotated around the rotation axis.

Figure 7:
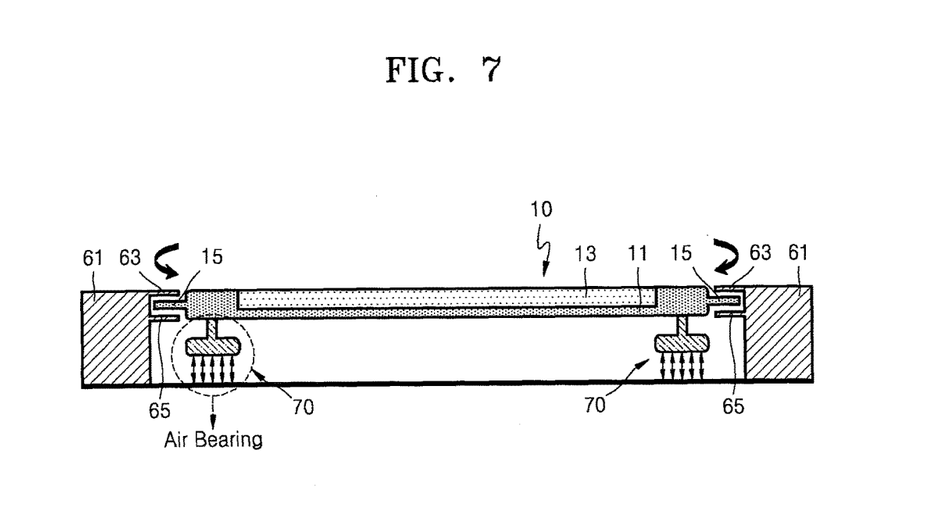
FIGS. 7 through 9 are diagrams showing embodiments of optical modules for vibrating a light beam which further include guide structures for controlling mechanical vibrations.
Figure 8:
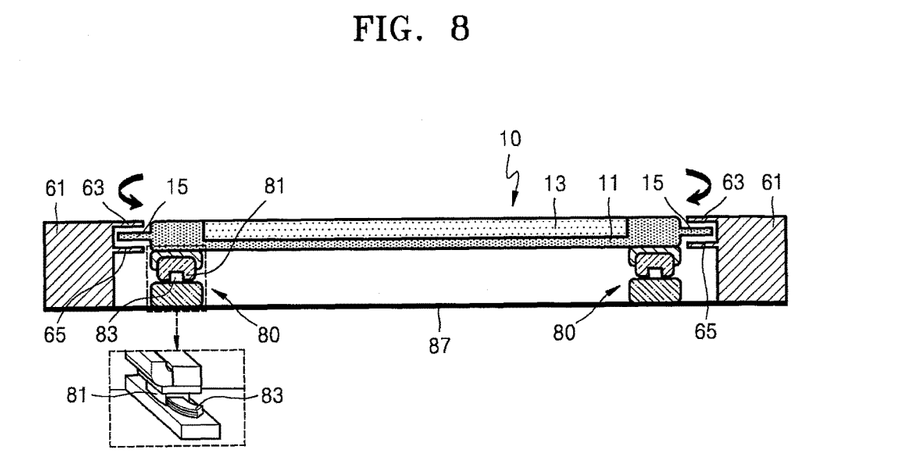
Figure 9:
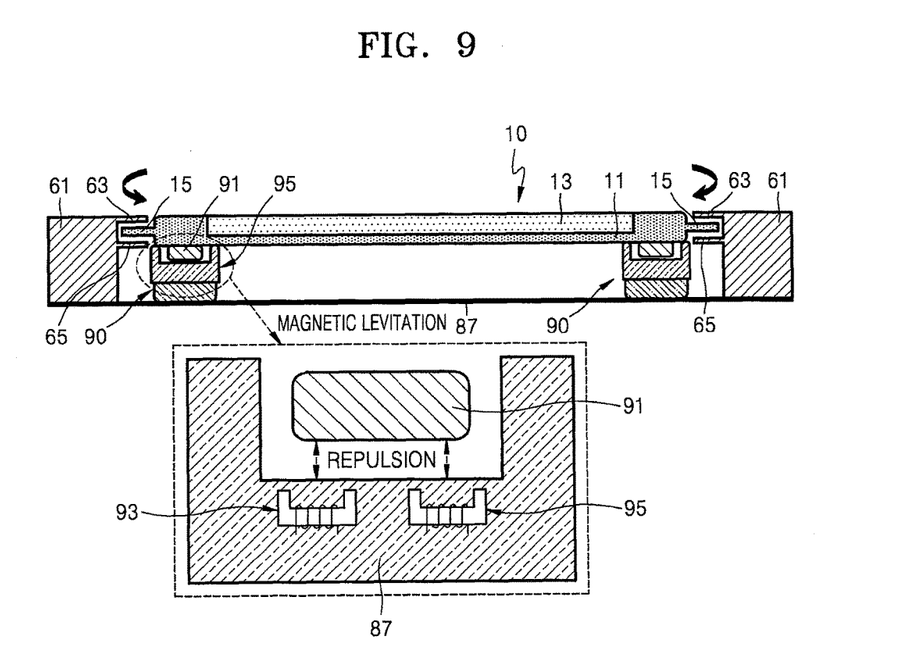

Meanwhile, the optical module for vibrating a light beam as described above with reference to FIGS. 1 through 4 may further include guiding structures 70, 80, and/or 90 for controlling (e.g., damping) mechanical vibrations in directions parallel to the rotation axis of the mirror unit 10 (e.g., upward and downward directions of FIG. 7) as shown in FIGS. 7 through 9.

Referring to FIG. 7, the guiding structures 70 may be air bearing structures which are attached at opposite ends of the mirror unit 10 and contactlessly restrict (or damp) vibration of the mirror unit 10 using air pressure, for example.

Furthermore, the guiding structure 80 may be an R-guide structure including, as shown in FIG. 8, a guide block 81 attached to the mirror unit 10 and a guide 83 attached to a base plate 87 and having a suitable curved shape corresponding to a rotation path (e.g., a rotation radius) of the mirror unit 10. The guide 83 is slidably accommodated in the guide block 81. The guiding structure 80 restricts vibration of the mirror unit 10.

Furthermore, as shown in FIG. 9, the guiding structure 90 may include magnetic bodies 91 attached at opposite ends of the mirror unit 10. Electromagnets 93 and 95 are attached to (e.g., integrated in) the base plate 87 and create repulsion against the magnetic bodies 91 to contactlessly restrict vibration of the mirror unit 10 based on a magnetic levitation principle.

Furthermore, any of various suitable guiding structures may be employed to restrict mechanical vibration in directions parallel to the rotation axis of the mirror unit 10.

Figure 10:
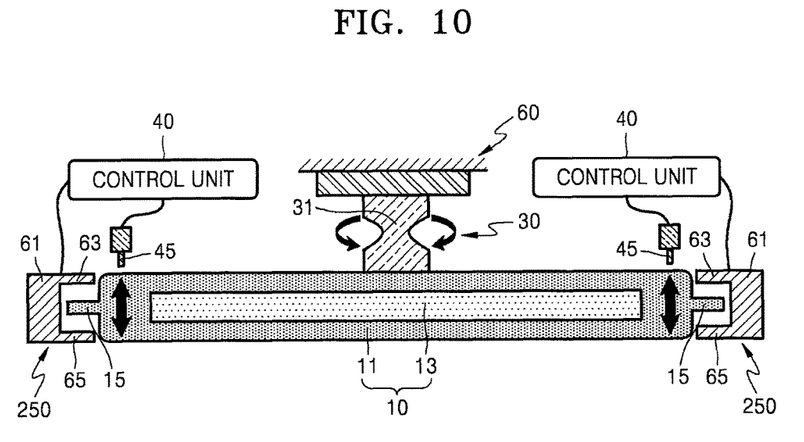
FIG. 10 is a diagram schematically showing an optical module for vibrating a light beam according to another embodiment of the present invention.
Figure 11:
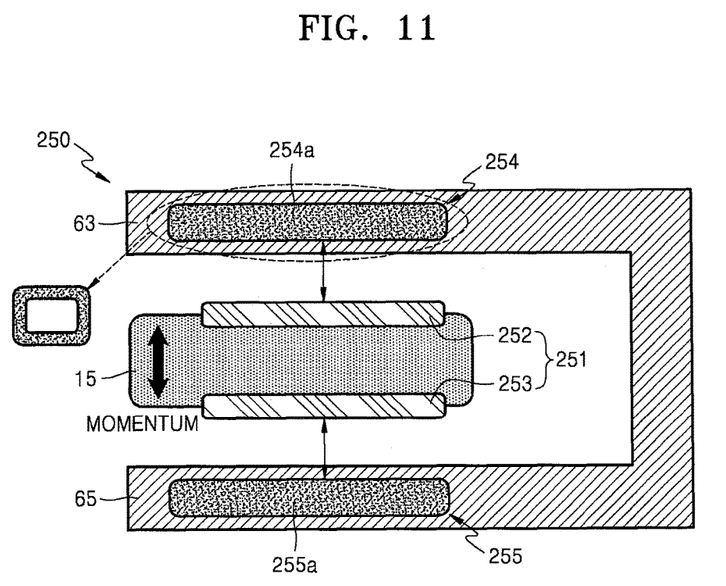
FIGS. 11 through 13 are diagrams showing embodiments of an actuator shown in FIG. 10.
Figure 12:
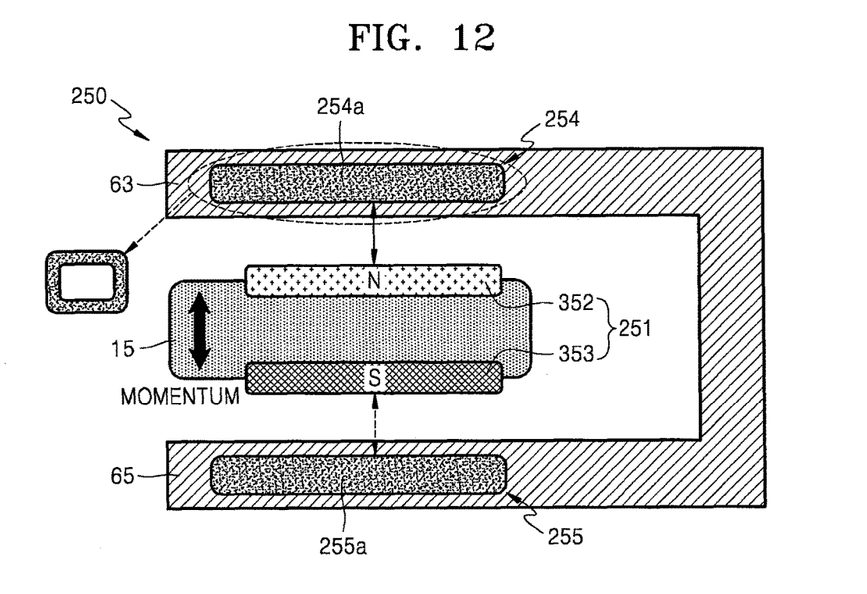
Figure 13:
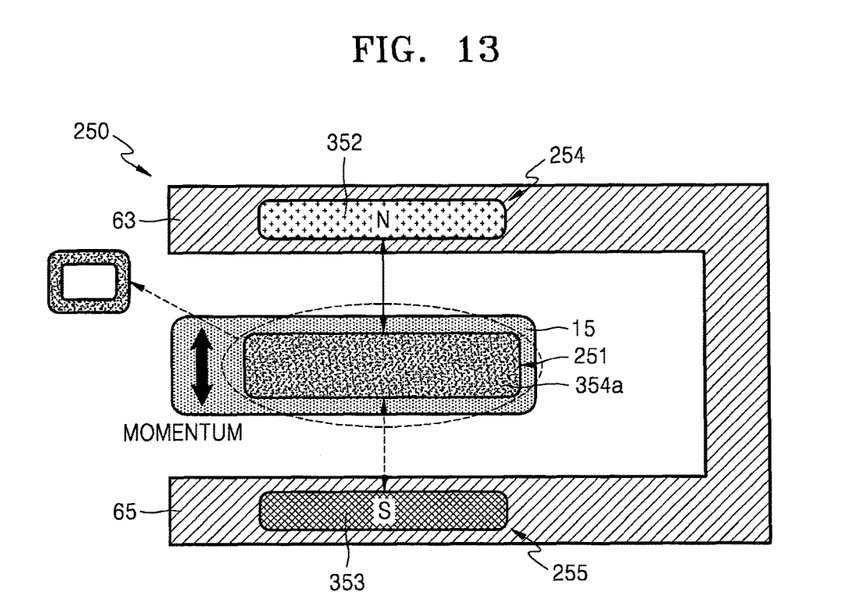

FIG. 10 is a diagram schematically showing an optical module for vibrating a light beam according to another embodiment of the present invention. FIGS. 11 through 13 are diagrams showing embodiments of an actuator 250 shown in FIG. 10. Compared to the optical module for vibrating a light beam as shown in FIGS. 1 and 2, in the optical module for vibrating a light beam shown in FIG. 10, the first plate unit 15 and the second and third plate units 63 and 65 are arranged crossing to the rotation axis and the mirror unit 10 is repeatedly rotated based on the magnetic levitation principle.

Referring to FIGS. 11 through 13, the actuator 250 may include a first actuator unit 251 arranged at the first plate unit 15 and second and third actuator units 254 and 255 arranged at the second and third plate units 63 and 65, respectively.

Referring to FIG. 11, the first actuator unit 251 may include a first iron plate 252 arranged at a side of the first plate unit 15 facing the second plate unit 63 and a second iron plate 253 arranged at another side of the first plate unit 15 facing the third plate unit 65. The second actuator unit 254 may include a first electromagnet 254*a* arranged at the second plate unit 63 to face the first iron plate 252 and the third actuator unit 255 may include a second electromagnet 255*a* arranged at the third plate unit 65 to face the second iron plate 253. For example, the first iron plate 252 and/or the second iron plate 253 may be formed of stainless steel (SUS).

Because the actuator 250 uses iron plates instead of permanent magnets in the other described embodiments, no magnetic repulsion occurs and only magnetic attraction is used to drive (e.g., rotate) the mirror unit 10.

For example, by controlling power applied to the first electromagnet 254*a* and the second electromagnet 255*a*, respectively, the first plate unit 15, which is movable, moves toward the second plate unit 63 when magnetic attraction is created between the first electromagnet 254*a* and the first iron plate 252 and the first plate unit 15 moves toward the third plate unit 65 when magnetic attraction is created between the second electromagnet 255*a* and the second iron plate 253. Therefore, the mirror unit 10 may be rotated around the rotation axis by using magnetic attraction between the first electromagnet 254*a* and the first iron plate 252 and between the second electromagnet 255a and the second iron plate 253 by controlling power respectively applied to the first electromagnet 254a and the second electromagnet 255a. In this embodiment, a force of the first electromagnet 254a or the second electromagnet 255a acting on (e.g., pulling or attracting) the mirror unit 10 may be controlled by controlling a current flowing through the first electromagnet 254a and the second electromagnet 255a, respectively, thereby generating a rotative force.

Referring to FIG. 12, the actuator 250 may include a permanent magnet instead of the iron plate, which may create a stronger magnetic force. For example, referring to FIG. 12, the first actuator unit 251 may include a first permanent magnet 352 arranged at the side of the first plate unit 15 facing the second plate unit 63 and a second permanent magnet 353 arranged at the other side of the first plate unit 15 facing the third plate unit 65. The second actuator unit 254 may include the first electromagnet 254a arranged at the second plate unit 63 to face the first permanent magnet 352, and the third actuator unit 255 may include the second electromagnet 255a arranged at the third plate unit 65 to face the second permanent magnet 353.

In this embodiment, the mirror unit 10 may be rotated around the rotation axis based on magnetic attraction and magnetic repulsion between the first electromagnet 254a and the first permanent magnet 352 and between the second electromagnet 255a and the second permanent magnet 353 by controlling power relatively applied to the first electromagnet 254a and the second electromagnet 255a.

FIG. 13 shows a structure of the actuator 250 in which electromagnets are installed at the mirror unit 10 (e.g., at the first plate unit 15), unlike the structure shown in FIG. 12. Referring to FIG. 13, the first actuator unit 251 includes an electromagnet 354a arranged at the first plate unit 15, the second actuator unit 254 includes the first permanent magnet 352 arranged at the second plate unit 63 to be at a side of the electromagnet 354a of the first actuator unit 251, and the third actuator unit 255 may include the second permanent magnet 353 arranged at the third plate unit 65 to be at another side (e.g., an opposite side) of the electromagnet 354a of the first actuator unit 251.

In this embodiment, the mirror unit 10 may be rotated around the rotation axis based on magnetic attraction and magnetic repulsion between the electromagnet 354a and the first permanent magnet 352 and between the electromagnet 354a and the second permanent magnet 353 by controlling power respectively applied to the electromagnet 354a.

Although FIG. 10 exemplifies an embodiment in which the flexible hinge 31 is arranged as the center guiding unit 30, the center guiding unit 30 of FIG. 10 may also be the bearing structure as shown in FIG. 6.

The indications of N-polarity and S-polarity of the permanent magnets shown in FIGS. 3, 4, 12, and 13 are not limited thereto and may vary.

Although embodiments of the present invention have been described above, embodiments of the present invention are not limited thereto, and various modifications may be made thereto as long as the mirror unit 10 is repeatedly rotated around the rotation axis based on magnetic attraction and magnetic repulsion at opposite ends of the mirror unit 10.

For example, as shown in FIGS. 14 through 17, in an optical module for vibrating a light beam according to another embodiment of the present invention, an actuator 450 may include a coil-type electromagnet 455 which includes an iron pin 457 and a coil 456 wound around the iron pin 457 and a permanent magnet 451 to repeatedly rotate the mirror unit 10.

Referring to FIGS. 14 through 17, the optical module for vibrating a light beam may include the mirror unit 10, which includes the mirror holder 11 for mounting the mirror 13 thereon, and the actuator 450 for rotating the mirror unit 10. The optical module for vibrating a light beam may further include a center guiding unit supporting and allowing the mirror unit 10 to rotate around the rotation axis. The center guiding unit may be a flexible hinge or a bearing structure, for example. Various other suitable types of center guiding units may also be employed. In FIGS. 14 through 17, the mirror and the center guiding unit are omitted to clearly illustrate characteristics of the actuator 450.

The actuator 450 may include first actuator units 451, which are arranged at opposite ends of the mirror unit 10 and are movable portions of the actuator 450, and one or more second actuator units 454, which are fixed portions of the actuator 450, at opposite sides of the mirror unit 10. Interaction between the first actuator unit 451 and the second actuator units 454 causes the mirror unit 10 to be repeatedly rotated around the rotation axis in a clockwise or counter-clockwise direction. In this embodiment, the first actuator units 451 may include permanent magnets, and the second actuator units 454 may include coil-type electromagnets 455, each of which includes an iron pin 457 and a coil 456 wound around the iron pin 457.

Figure 14:
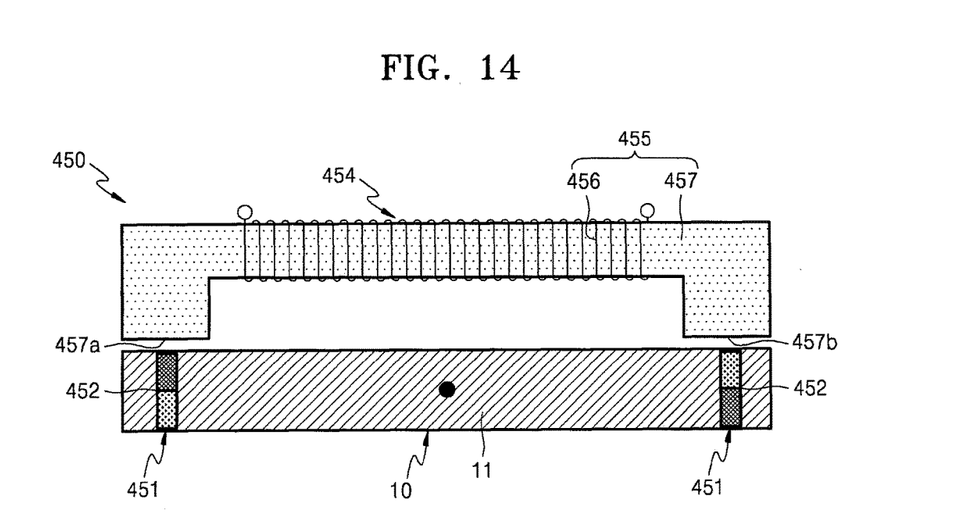
FIGS. 14 through 17 are diagrams schematically showing an optical module for vibrating a light beam according to another embodiment of the present invention.

Referring to FIG. 14, the permanent magnets 452 may be arranged in a direction in which the mirror unit 10 is rotated, and the iron pins 457 may be arranged along a direction parallel to the mirror unit 10 to have end portions 457a and 457b facing the permanent magnets 452 in the direction in which the mirror unit 10 is rotated.

Figure 15:
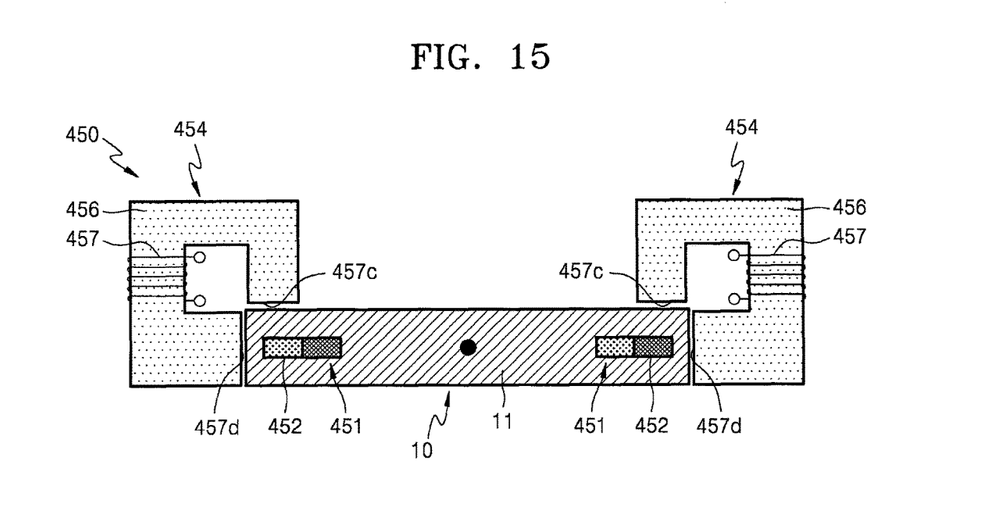

Referring to FIG. 15, the permanent magnets 452 may be arranged in a direction away from the rotation axis of the mirror unit 10, and the iron pins 457 may be arranged at opposite ends of the mirror unit 10. The iron pins 457 may include first end portions 457c facing the permanent magnets 452 in a direction in which the mirror unit 10 is rotated and second end portions 457d arranged outside the mirror unit 10 to face the mirror unit 10.

Figure 16:
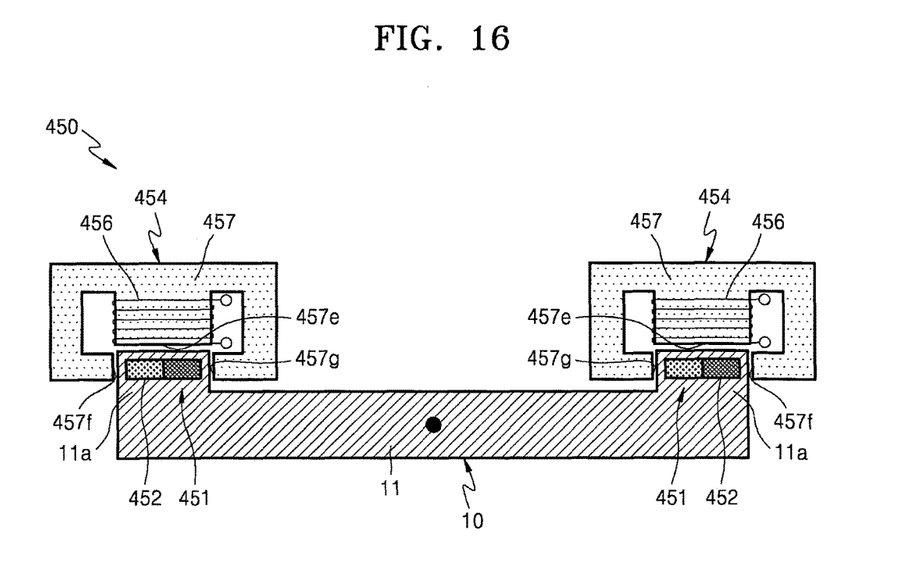

Referring to FIG. 16, the mirror holder 11 of the mirror unit 10 may include protrusions 11a protruding from two opposite ends of the mirror unit 10 in the direction in which the mirror unit 10 is rotated, the permanent magnets 452 may be arranged in a direction away from the rotation axis of the mirror unit 10, and the iron pins 457 may include first end portions 457e facing the protrusions in the direction in which the mirror unit 10 is rotated and second and third end portions 457f and 457g arranged at opposite ends (e.g., two opposite ends) of the protrusions 11a and facing each other.

Figure 17:
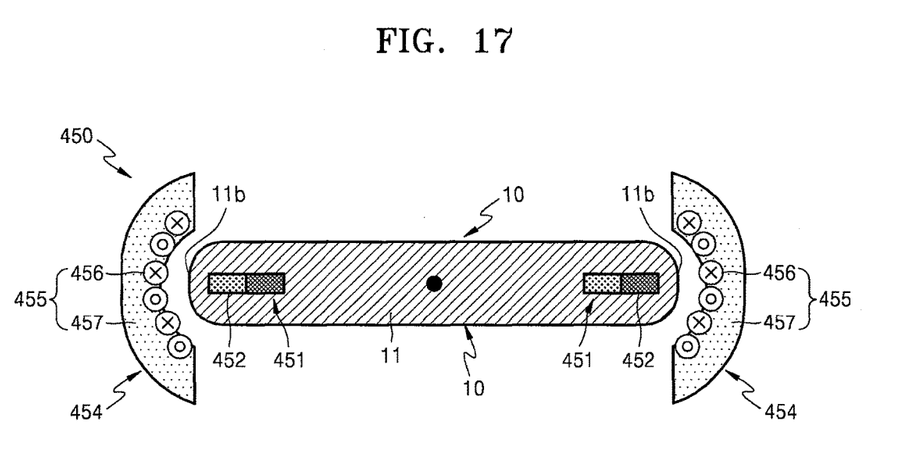

Furthermore, referring to FIG. 17, opposite ends 11b (e.g., two opposite ends) of the mirror holder 11 may be formed to have arc-like shapes, the iron pins 457 may be formed to have arc-like shapes to surround the opposite ends 11b of the mirror holder 11, and a plurality of arrays of the coils 456 may be arranged on surfaces of the iron pins 457 facing the opposite ends 11b of the mirror holder 11.

The actuator 450 described above with reference to FIGS. 14 through 17 are merely an example, and embodiments of the present invention are not limited thereto. Any of various modifications may be made thereto as long as the coil-type electromagnet 455 including the iron pin 457 and the coil 456 wound around the iron pin 457 and the permanent magnet 452, which is arranged at the mirror unit 10 to correspond to (e.g., to be aligned with) the electromagnet 455 are employed.

As described above, according to the one or more of the above embodiments of the present invention, the mirror unit 10 may be repeatedly rotated based on magnetic attraction and magnetic repulsion between electromagnets and permanent magnets (or iron plates) by controlling power applied to the electromagnets, sufficient driving force may be generated to rotate the mirror unit 10 even if the mirror 13 is relatively large and heavy, and the mirror unit 10 may be driven at a high speed (e.g., 100 Hz or greater) and may be displaced by a relatively large displacement in the range of millimeters.

Furthermore, because the mirror unit 10 is contactlessly rotated based on magnetic attraction and magnetic repulsion (e.g., rotated without direct or physical contact by a driver or motor), the mirror unit 10 is less sensitive to vibrations from outside, and thus, beam alignment may be improved.

What is claimed is:

1. An optical module for vibrating a light beam, the optical module comprising:
   a mirror unit comprising a mirror holder and a mirror on the mirror holder, the mirror holder comprising a first plate extending from a side of the mirror holder;
   a center guide supporting the mirror unit, a rotation axis of the mirror unit extending through a center of the center guide; and
   an actuator configured to rotate the mirror unit about the rotation axis, the actuator comprising:
      a first actuator at the first plate;
      a second plate and a third plate, the first plate being interposed between the second and third plates and the second and third plates being spaced from the first plate; and
      a second actuator and a third actuator at the second and third plates, respectively,
   wherein the first actuator is movable relative to the second and third actuators, and
   wherein the first actuator is configured to be acted upon by the second actuator and the third actuator to rotate the mirror unit about the rotation axis.

2. The optical module of claim 1, wherein the first plate is arranged between the second and third plates in a direction parallel to the rotation axis of the mirror unit.

3. An optical module for vibrating a light beam, the optical module comprising:
   a mirror unit comprising a mirror holder and a mirror on the mirror holder, the mirror holder comprising a first plate extending from a side of the mirror holder;
   a center guide supporting the mirror unit, a rotation axis of the mirror unit extending through a center of the center guide; and
   an actuator configured to rotate the mirror unit about the rotation axis, the actuator comprising:
      a first actuator at the first plate;
      a second plate and a third plate, the second and third plates being spaced from the first plate; and
      a second actuator and a third actuator at the second and third plates, respectively,
   wherein the first actuator is movable relative to the second and third actuators,
   wherein the first actuator is configured to be acted upon by the second actuator and the third actuator to rotate the mirror unit about the rotation axis,
   wherein the first plate is arranged between the second and third plates in a direction parallel to the rotation axis of the mirror unit,
   wherein the second actuator comprises a first electromagnet array over a first side of the first actuator,
   wherein the third actuator comprises a second electromagnet array over a second side of the first actuator, the second side being opposite to the first side,
   wherein the first actuator comprises:
      a first permanent magnet array facing the first electromagnet array; and
      a second permanent magnet array facing the second electromagnet array, and
   wherein the mirror unit is configured to be rotated about the rotation axis due to magnetic attraction and magnetic repulsion between the first electromagnet array and the first permanent magnet array and between the second electromagnet array and the second permanent magnet array.

4. The optical module of claim 3, wherein at least one from among the first and second electromagnet arrays and the first and second permanent magnet arrays is arranged in an arc-like shape.

5. The optical module of claim 2, wherein the first actuator comprises an electromagnet array,
   wherein the second actuator comprises a first permanent magnet array over a first side of the electromagnet array of the first actuator,
   wherein the third actuator comprises a second permanent magnet array over a second side of the electromagnet array of the first actuator, the first side being opposite to the second side, and
   wherein the mirror unit is configured to be rotated about the rotation axis due to magnetic attraction and magnetic repulsion between the electromagnet array and the first permanent magnet array and between the electromagnet array and the second permanent magnet array.

6. The optical module of claim 5, wherein at least one from among the electromagnet array and the first and second permanent magnet arrays is arranged in an arc-like shape.

7. The optical module of claim 1, further comprising a guiding structure configured to control mechanical vibration in a direction parallel to the rotation axis of the mirror unit.

8. The optical module of claim 7, wherein the guiding structure comprises at least two air-bearing units arranged at opposite ends of the mirror unit.

9. The optical module of claim 7, wherein the guiding structure comprises:
   a guide block on the mirror unit and having a groove; and
   a guide on a base plate and having a curved shape corresponding to a rotation path of the mirror unit, and
   wherein the groove of the guiding block is configured to accommodate the guide therein.

10. The optical module of claim 7, wherein the guiding structure comprises:
    at least two magnetic bodies at opposite ends of the mirror unit; and
    electromagnets on a base plate, the electromagnets configured to be charged to repulse the magnetic bodies.

11. The optical module of claim 1, wherein the first plate is between the second and third plates in a direction crossing to the rotation axis of the mirror unit.

12. The optical module of claim 11, wherein the second actuator comprises a first electromagnet array over a first side of the first actuator, wherein the third actuator comprises a second electromagnet array over a second side of the first actuator, the second side being opposite to the first side, wherein the first actuator comprises:
- a first iron plate facing the first electromagnet array; and
- a second iron plate facing the second electromagnet array, and wherein the mirror unit is configured to be rotated about the rotation axis due to magnetic attraction between the first electromagnet array and the first iron plate or between the second electromagnet array and the second iron plate.

13. The optical module of claim 11, wherein the second actuator comprises a first electromagnet over a first side of the first actuator, wherein the third actuator comprises a second electromagnet over a second side of the first actuator, the second side being opposite to the first side, wherein the first actuator comprises:
- a first permanent magnet facing the first electromagnet; and
- a second permanent magnet facing the second electromagnet, and wherein the mirror unit is configured to be rotated about the rotation axis due to magnetic attraction and magnetic repulsion between the first electromagnet and the first permanent magnet and between the second electromagnet and the second permanent magnet.

14. The optical module of claim 11, wherein the first actuator comprises an electromagnet, wherein the second actuator comprises a first permanent magnet over a side of the electromagnet of the first actuator, wherein the third actuator comprises a second permanent magnet over another side of the electromagnet of the first actuator, and wherein the mirror unit is configured to be rotated about the rotation axis due to magnetic attraction and magnetic repulsion between the electromagnet and the first permanent magnet and between the electromagnet and the second permanent magnet.

15. The optical module of claim 1, wherein the center guiding unit comprises a flexible hinge or a bearing structure.

16. An optical module for vibrating a light beam, the optical module comprising:
- a mirror unit comprising a mirror holder configured to receive a mirror thereon and a plurality of first actuators, the first actuators comprising permanent magnets; and
- a second actuator at opposite ends of the mirror unit, comprising a coil-type electromagnet, and configured to rotate the mirror unit about a rotation axis, the coil-type electromagnet comprising an iron pin and a coil wound around the iron pin, wherein the first actuators are configured to move relative to the second actuator, and wherein the first actuators are configured to be acted upon by the second actuator to rotate the mirror unit about the rotation axis.

17. The optical module of claim 16, wherein the permanent magnets are arranged in a direction in which the mirror unit is rotated, and wherein the iron pin is arranged along a direction parallel to the mirror unit and has end portions facing the permanent magnets in the direction in which the mirror unit is rotated.

18. The optical module of claim 16, wherein the permanent magnets are arranged along a direction away from the rotation axis of the mirror unit, wherein the second actuator comprises a plurality of second actuators, and wherein the iron pins of the second actuators are at the opposite ends of the mirror unit and first end portions thereof face the permanent magnets in a direction away from the rotation axis of the mirror unit and second end portions thereof face the permanent magnets in the direction in which the mirror unit is rotated.

19. The optical module of claim 16, wherein the mirror unit comprises protrusions at the opposite ends of the mirror unit protruding in a direction in which the mirror unit is rotated, wherein the permanent magnets are arranged at the protrusions in a direction away from the rotation axis of the mirror unit, wherein the second actuator comprises a plurality of second actuators, and wherein the iron pins of the second actuators each have a first end portion facing the protrusions in the direction in which the mirror unit is rotated and second end portions at opposite sides of the respective protrusions and facing each other.

20. The optical module of claim 16, wherein the opposite ends of the mirror holder have an arc-like shape, wherein the second actuator comprises a plurality of second actuators, wherein the iron pins of the second actuators each have the arc-like shape and at least partially surround the opposite ends of the mirror holder, and wherein arrays of the coils are on respective surfaces of the iron pins facing the mirror holder.

* * * * *